United States Patent
Wang et al.

(10) Patent No.: US 11,734,939 B2
(45) Date of Patent: Aug. 22, 2023

(54) VISION-BASED CELL STRUCTURE RECOGNITION USING HIERARCHICAL NEURAL NETWORKS AND CELL BOUNDARIES TO STRUCTURE CLUSTERING

(71) Applicant: International Business Machines Corporation, Armonk, NY (US)

(72) Inventors: Xin Ru Wang, San Jose, CA (US); Douglas R. Burdick, San Jose, CA (US); Xinyi Zheng, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/529,618

(22) Filed: Nov. 18, 2021

(65) Prior Publication Data

US 2022/0076012 A1    Mar. 10, 2022

Related U.S. Application Data (63) Continuation of application No. 16/847,792, filed on Apr. 14, 2020, now Pat. No. 11,222,201.

(51) Int. Cl.
  *G06V 30/412*  (2022.01)
  *G06T 7/10*    (2017.01)
  (Continued)

(52) U.S. Cl.
  CPC .......... *G06V 30/412* (2022.01); *G06N 3/045* (2023.01); *G06T 7/10* (2017.01); *G06V 10/454* (2022.01);
  (Continued)

(58) Field of Classification Search
  CPC .. G06V 30/194; G06V 30/248; G06V 30/412; G06V 30/413; G06V 30/416;
  (Continued)

(56) References Cited

U.S. PATENT DOCUMENTS

| 6,006,240 A | 12/1999 | Handley |
| 7,054,871 B2 | 5/2006 | Hu et al. |

(Continued)

FOREIGN PATENT DOCUMENTS

| CN | 109816107 A | 5/2019 |
| CN | 109992000 A | 7/2019 |

(Continued)

OTHER PUBLICATIONS

Gilani et al., "Table Detection using Deep Learning", Research Gate 2017.

(Continued)

*Primary Examiner* — Daniel G Mariam
(74) *Attorney, Agent, or Firm* — Ryan, Mason & Lewis, LLP (57) ABSTRACT

Methods, systems, and computer program products for vision-based cell structure recognition using hierarchical neural networks and cell boundaries to structure clustering are provided herein. A computer-implemented method includes detecting a style of the given table using at least one style classification model; selecting, based at least in part on the detected style, a cell detection model appropriate for the detected style; detecting cells within the given table using the selected cell detection model; and outputting, to at least one user, information pertaining to the detected cells comprising image coordinates of one or more bounding boxes associated with the detected cells.

14 Claims, 6 Drawing Sheets

(51) Int. Cl.
| | |
|---|---|
| *G06V 30/416* | (2022.01) |
| *G06V 30/24* | (2022.01) |
| *G06V 30/413* | (2022.01) |
| *G06N 3/045* | (2023.01) |
| *G06V 10/762* | (2022.01) |
| *G06V 10/764* | (2022.01) |
| *G06V 10/82* | (2022.01) |
| *G06V 10/44* | (2022.01) |

(52) U.S. Cl.
CPC .......... *G06V 10/763* (2022.01); *G06V 10/764* (2022.01); *G06V 10/82* (2022.01); *G06V 30/248* (2022.01); *G06V 30/413* (2022.01); *G06V 30/416* (2022.01); *G06T 2207/20081* (2013.01); *G06T 2207/20084* (2013.01); *G06V 30/2528* (2022.01)

(58) Field of Classification Search
CPC ................. G06V 30/2528; G06T 7/10; G06T 2207/20081; G06T 2207/20084; G06N 3/0454
See application file for complete search history.

(56) References Cited

U.S. PATENT DOCUMENTS

| | | | |
|---|---|---|---|
| 8,443,278 | B2 | 5/2013 | Mansfield et al. |
| 9,268,999 | B2 | 2/2016 | Xu et al. |
| 9,753,959 | B2 | 9/2017 | Birdwell et al. |
| 10,733,433 | B2 * | 8/2020 | Krishnapura Subbaraya .............. G06V 30/412 |
| 10,789,543 | B1 | 9/2020 | Sun |
| 2001/0045961 | A1 | 11/2001 | Stoakley et al. |
| 2004/0163048 | A1 | 8/2004 | McKnight et al. |
| 2006/0195782 | A1 | 8/2006 | Wang et al. |
| 2007/0061714 | A1 | 3/2007 | Stuple et al. |
| 2011/0249905 | A1 | 10/2011 | Singh et al. |
| 2017/0052941 | A1 | 2/2017 | Bastide et al. |
| 2017/0286810 | A1 | 10/2017 | Shigenaka et al. |
| 2018/0121807 | A1 | 5/2018 | Wick et al. |
| 2018/0315193 | A1 | 11/2018 | Paschalakis et al. |
| 2018/0322365 | A1 | 11/2018 | Yehezkel Rohekar et al. |
| 2019/0156179 | A1 | 5/2019 | Thiele et al. |
| 2019/0287292 | A1 | 9/2019 | Ceccaldi et al. |
| 2019/0303663 | A1 | 10/2019 | Krishnapura et al. |
| 2019/0340240 | A1 | 11/2019 | Duta |
| 2019/0384790 | A1 | 12/2019 | Bequet et al. |
| 2019/0392307 | A1 | 12/2019 | Liao |
| 2021/0056300 | A1 | 2/2021 | Chitta |
| 2021/0117667 | A1 | 4/2021 | Mehra |
| 2021/0201018 | A1 | 7/2021 | Patel |

FOREIGN PATENT DOCUMENTS

| | | |
|---|---|---|
| CN | 110866602 A | 3/2020 |
| WO | 2012006509 A1 | 1/2012 |

OTHER PUBLICATIONS

Schreiber et al., DeepDeSRT: Deep Learning for Detection and Structure Recognition of Tables in Document Images, 2017 14th IAPR International Conference on Document Analysis and Recognition (ICDAR), Nov. 2017.

Elowsson, A., Deep Layered Learning in MIR, 2018.

Xu et al., Neural Task Programming: Learning to Generalize Across Hierarchical Tasks, 2018.

Reeder, J., Life Long Learning in Sparse Learning Environments, 2013.

ip.com, IPCOM000254791D, Branching Neural Networks, Aug. 2, 2018.

ip.com, IPCOM000186133D, Dynamic Cost-Based Optimization Using Branch Prediction for Workflow Based Systems, Aug. 11, 2009.

ip.com, IPCOM000181436D, Learning Essential Non-Linear Feature Sub-space for Pattern Classification Using Hetero-Associative Neural Networks, Apr. 2, 2009.

Stewart et al., Label-free supervision of neural networks with physics and domain knowledge. Sep. 2016.

Turner et al., SPARCNN: Spatially related convolutional neural networks. In 2016 IEEE Applied Imagery Pattern Recognition Workshop (AIPR) (pp. 1-6). IEEE Oct. 2016.

Shrivastava et al., Cooperative neural networks (CoNN): Exploiting prior independence structure for improved classification. In Advances in Neural Information Processing Systems (pp. 4126-4136). 2018.

Shrivastava et al., Learning from simulated and unsupervised images through adversarial training. In Proceedings of the IEEE conference on computer vision and pattern recognition (pp. 2107-2116) Jul. 2017.

Peter Mell, et al. The NIST Definition of Cloud Computing, Recommendations of the National Institute of Standards and Technology, US Department of Commerce, Special Publicaiton 800-145, Sep. 2011, pp. 1-7.

List of IBM Patents or Patent Applications Treated as Related, Nov. 12, 2021, pp. 1-2.

Chi et al. Complicated Table Structure Recognition, pp. 1-9, (Year: 2019).

* cited by examiner

FIG. 1

| | Cell Boundary to Structure Cluster Algorithm |
|---|---|
| 200 | |

1: procudure Preprocess Cell Bounding Boxes
2:    for $b$ in *cellboxes* do
3:       if not INTERSECT($b$, *textboxes*) then
4:          DELETE $b$
5:       if INTERSECT($b$, *textboxes*) then
6:          $b$.bounding_box = MAX($b$.bounding_box, *textbox*.bounding_box)
7:       if INTERSECT($b$, *cellboxes*) then
8:          $b$.bounding_box = MAX($b$.bounding_box, *cellbox*.bounding_box)
9: procudure Assign Cell Row and Column Location
10:    while not INTERSECT($b$, *cellboxes*) do
11:       $b$.x1 ← $b$.x1 − 5
12:       $b$.x2 ← $b$.x2 + 5
13:    for $b$ in *cellboxes* do
14:       $num_{col}$ ← MAX(CNT_INTERSEC($b$.midx, *cellboxes*), $num_{col}$)
15:       $num_{row}$ ← MAX(CNT_INTERSEC($b$.midy, *cellboxes*), $num_{row}$)
16:    $alignment_x$, $alignment_y$ ← GET_XY_ALIGNMENT(*cellboxes*)
17:    for $b$ in *cellboxes* do
18:       $b.align_x$ ← ALIGN_DATA($b$.x1, $b$.midx, $b$.x2, $alignment_x$)
19:       $b.align_y$ ← ALIGN_DATA($b$.y1, $b$.midy, $b$.y2, $alignment_y$)
20:    $col_{posx}$ ← KMeans($cell_boxes.align_x$, $num_{col}$)
21:    $row_{pos^x}$ ← KMeans($cell_boxes.align_y$, $num_{row}$)
22:    for $b$ in *cellboxes* do
23:       $b$.col ← ALIGN_TO_COL($b.align_x$, $col_{posx}$, $alignment_x$)
24:       $b$.row ← ALIGN_TO_ROW($b.align_y$, $col_{posy}$, $alignment_y$)
25: procudure Assign Text Lines to Table
26:    for $b$ in *textboxes* do
27:       if I thenNTERSECT($b$, *cellboxes*)
28:          $b$.col ← cellbox.col
29:          $b$.row ← cellbox.row
30:       else
31:          $b$.col ← ALIGN_TO_COL($b.align_x$, $col_{posx}$, $alignment_x$)
32:          $b$.row ← ALIGN_TO_ROW($b.align_y$, $col_{posy}$, $alignment_y$)
33: procudure Split Cell Text Lines When Neighbor Is Empty
34:    for $r$ in $num_{row}$ do
35:       for $c$ in $num_{col}$ do
36:          if I thenS_EMPTY($r$, $c$)
37:             $neighbor_{text}$ ← GET_CELLS($r$ − 1, $c$) + GET_CELLS($r$ + 1, $c$)
38:             for $b$ in $neighbor_{text}$ do
39:                 $b$.col ← ALIGN_TO_COL($b.align_x$, $col_{posx}$, $alignment_x$)
40:                 $b$.row ← ALIGN_TO_ROW($b.align_y$, $col_{posy}$, $alignment_y$)

VISION-BASED CELL STRUCTURE RECOGNITION USING HIERARCHICAL NEURAL NETWORKS AND CELL BOUNDARIES TO STRUCTURE CLUSTERING

FIELD

The present application generally relates to information technology and, more particularly, to document analysis techniques.

BACKGROUND

Document analysis and understanding typically require accurate cell structure recognition of table contents. However, many documents are stored and distributed in portable document format (PDF) or image format, which often fail to preserve formatting of any table that the documents contain. Additionally, conventional document analysis techniques commonly rely on hand-crafted features that require expensive and time-consuming human expertise when new document styles are encountered. Also, conventional object detection techniques often face challenges with respect to detecting small and/or oblong objects such as table cells, and typically do not consider visual elements of documents such as boundaries, shading, fonts, etc.

SUMMARY

In one embodiment of the present invention, techniques for vision-based cell structure recognition using hierarchical neural networks and cell boundaries to structure clustering are provided. An exemplary computer-implemented method can include detecting a style of the given table using at least one style classification model, and selecting, based at least in part on the detected style, a cell detection model appropriate for the detected style. The method can also include detecting cells within the given table using the selected cell detection model, and outputting, to at least one user, information pertaining to the detected cells comprising image coordinates of one or more bounding boxes associated with the detected cells.

In another embodiment of the invention, an exemplary computer-implemented method can include removing one or more cell boxes associated with the cells in the table that do not overlap with any text boxes associated with the table, and expanding one or more remaining cell boxes associated with the cells in the table until each of the one or more remaining cell boxes is expanded to a maximum horizontal width without overlapping with one or more of the other remaining cell boxes. Such a method also includes sampling at the center of each expanded cell box, horizontally and vertically, to determine a number of rows in the table and a number of columns in the table, and determining an alignment for rows and columns of the table based at least in part on the one or more remaining cell boxes prior to said expanding. Additionally, such a method includes using at least one K-means clustering technique on the one or more remaining cell boxes based at least in part on the determined number of rows in the table and the determined number of columns in the table, and assigning each of the one or more remaining cell boxes to a respective row and a respective column based at least in part on the determined alignment.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 shows an example code snippet for a cell boundary to structure cluster algorithm, according to an exemplary embodiment of the invention;

DETAILED DESCRIPTION

As described herein, an embodiment of the present invention includes vision-based cell structure recognition using hierarchical neural networks and cell boundaries to structure clustering. Such an embodiment includes using one or more neural networks to identify cells (of a table) and using at least one cell clustering technique to determine table structure.

Additionally, at least one embodiment includes generating and/or implementing a global table extractor (GTE), a vision-guided framework for cell structured recognition, which can be built, for example, on top of one or more object detection models. Such an embodiment can also include implementing at least one algorithm that detects the boundaries of one or more cells using a style-aware hierarchical model, and such detected boundaries can be converted to structural details with alignment and coordinate-based clustering.

As further detailed herein, after cells are detected, one or more embodiments include leveraging a sampling and clustering method to infer the number of rows and columns in the table, as well as the position of each cell in the table. Such a clustering method also identifies table cells which span multiple rows and columns.

Figure 1:
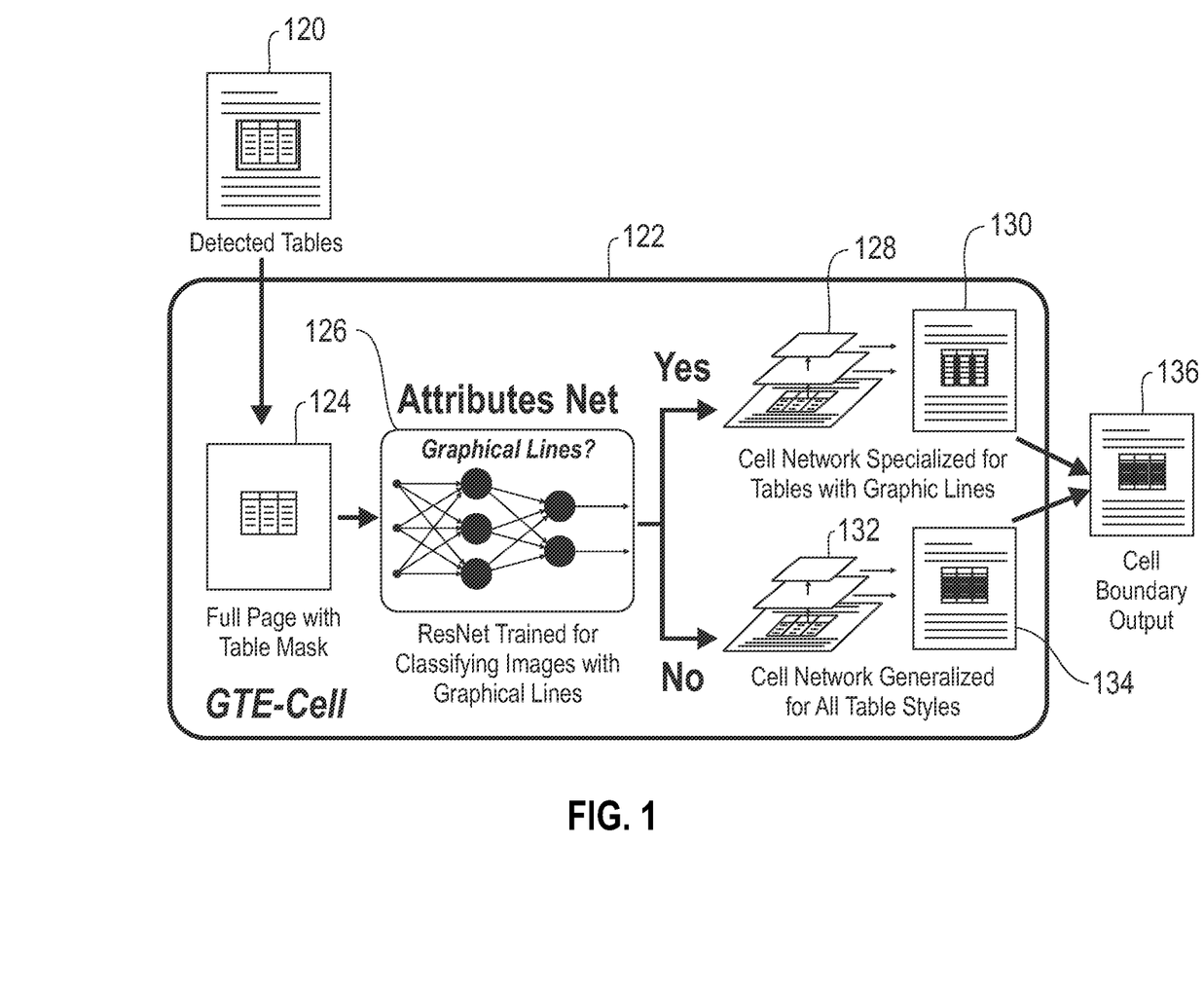
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an overview of hierarchical cell detection in one or more embodiments, which can include, for example, an input of at least one full page image, from which one or more tables 120 are detected, which are processed by a GTE-cell component 122 to generate a cell boundary output 136.

As further detailed herein, at least one embodiment includes generating and/or implementing a GTE framework that includes networks for table boundary detection and cell boundary detection (GTE-cell component 122). As illustrated in the FIG. 1 example, an input to the GTE-cell component 122 can include an image form of a document page, while the GTE-cell component 122 also depends on table boundaries (determined in connection with the detected tables 120) to generate cell structures for each specific table.

Referring again to FIG. 1, with respect to the GTE-cell component 122, it is to be appreciated that tables often adhere to a global style that determines the rules and meanings of its components. For example, there are some tables that have visible vertical and horizontal ruling lines for every row and column, easily defining cell boundaries. However, there are other styles that have no ruling lines or have only intermittent breaks. In such a case, a model that only looks at local surroundings would not be able to ascertain whether a ruling line represents the start of a new cell.

Accordingly, at least one embodiment includes training at least one attribute neural network (e.g., network 126) aimed at classifying the presence of vertical graphical ruling lines in a table. As depicted in the example of FIG. 1, an input in the form of a full page with a table mask 124 (generated based at least in part on an input image and detected tables 120) is processed by attribute neural network 126. The output of neural network 126 determines which of two cell detection networks is used. A cell network 132 generalized for all table styles can be trained on data that are composed of tables with and without graphical lines and/or add vertical and/or horizontal boundaries for one or more rows and columns at the median point between cells (as depicted, for example, via component 134). A cell network 128 specialized for tables with graphic lines is trained on the original input plus full boundaries data to generate outputs (such as, for example, component 130) such that the network relies more on the graphical lines of the table when detecting cell boundaries.

To convert a cell bounding box output into a logical structure (e.g., component 136), one or more embodiments includes aligning cell boxes to text lines as extracted from the document (e.g., a PDF document). Subsequently, such an embodiment includes determining the number of rows and columns by sampling in the vertical and horizontal directions, respectively. Before sampling in the vertical direction to determine the number of rows, at least one embodiment can include expanding the left and right edges of cells while not overlapping with existing cells, to account for rows with missing cells. Then, such an embodiment can include inferring the vertical and horizontal alignments of the table by which the cell box edge has the best alignment with one or more other cells. At least one embodiment includes using K-means clustering on cell bounding box coordinates to define row and column locations. Subsequently, one or more embodiments include assigning row and column positions to each cell based on their box locations, merging cells when necessary.

Additionally, at least one embodiment includes leveraging an assumption that cell content generally starts with a capital letter. Therefore, cells that start with a lower case letter are determined to be a case of over-splitting, and such cells are merged with a proximate cell (e.g., the cell above). Also, one or more embodiments include performing at least one post-processing step, which can include assigning locations to leftover text boxes that were not overlapping with any detected cells, and splitting cells in certain cases when there are gaps nearby. Before producing the final logical structure 136 of each cell in the table, at least one embodiment can include increasing the row and column span of cells when the text box intersects with neighboring empty rows or columns, as this is likely a hierarchical cell spanning multiple rows or columns.

FIG. 2 shows an example code snippet for a cell boundary to structure cluster algorithm, according to an exemplary embodiment of the invention. In this embodiment, example code snippet 200 is executed by or under the control of at least one processing system and/or device. For example, the example code snippet 200 may be viewed as comprising a portion of a software implementation of at least part of GTE-cell component 122 of the FIG. 1 embodiment.

The example code snippet 200 illustrates the preprocessing of cell boundary boxes such that the boundary boxes may be merged when sufficiently intersecting, and may be deleted when there are no overlapping text boxes. Example code snippet 200 also illustrates a process of assigning cell row and column locations to each cell by determining the number of rows and columns, and clustering to find the boundaries of the determined rows and columns.

It is to be appreciated that this particular example code snippet shows just one example implementation of at least a portion of a cell boundary to structure cluster algorithm, and alternative implementations of the process can be used in other embodiments.

Figure 3:
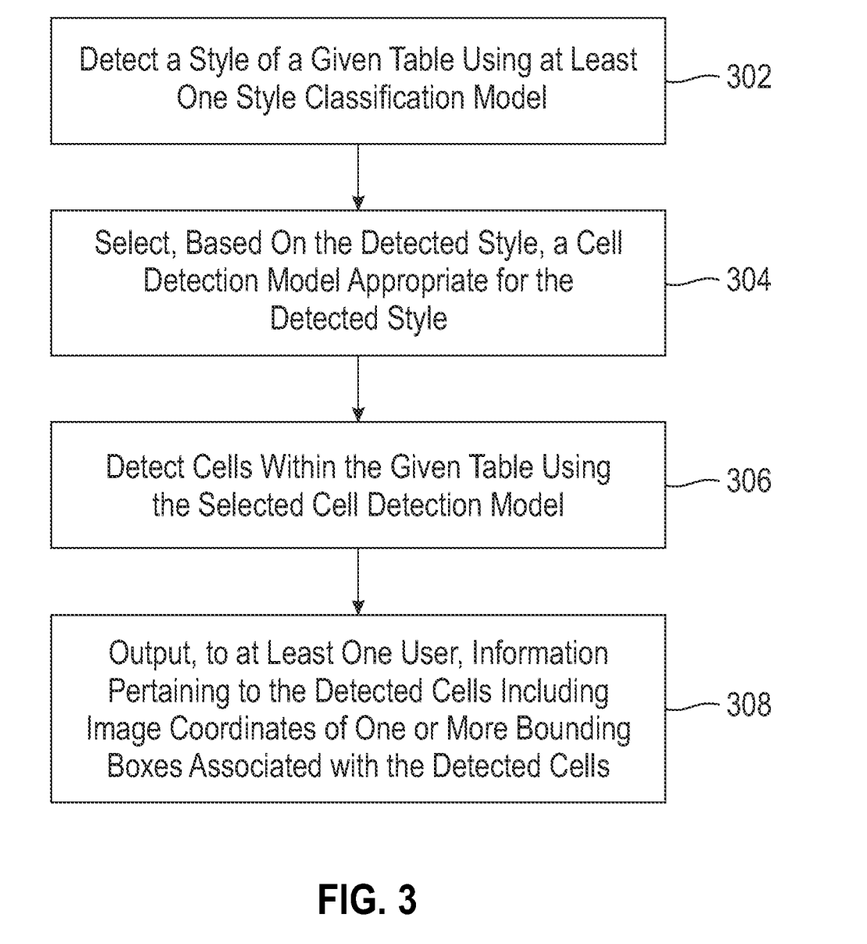
FIG. 3 is a flow diagram illustrating techniques according to an embodiment of the invention.

FIG. 3 is a flow diagram illustrating techniques (e.g., a computer-implemented method for use with a given table in a document) according to an embodiment of the present invention. Step 302 includes detecting a style of the given table using at least one style classification model. In one or more embodiments, the at least one style classification model includes a deep neural network trained on multiple tables comprising multiple formatting attributes (e.g., attributes pertaining to graphical lines, highlighting, bolding, font size, font type, italicizing, etc.). Also, in at least one embodiment, detecting the style of the given table includes detecting boundaries of the given table using one or more object detection models.

Step 304 includes selecting, based at least in part on the detected style, a cell detection model appropriate for the detected style. Step 306 includes detecting cells within the given table using the selected cell detection model. In at least one embodiment, the selected cell detection model has been trained using at least one deep neural network on tables including at least one style similar to that of the given table. Additionally, or alternatively, in such an embodiment, the selected cell detection model has been trained using at least one deep neural network on tables including multiple styles.

Also, in one or more embodiments, detecting the cells within the given table includes using one or more optical character recognition techniques in conjunction with the selected cell detection model.

Step 308 includes outputting, to at least one user, information pertaining to the detected cells comprising image coordinates of one or more bounding boxes associated with the detected cells. The techniques depicted in FIG. 3 can also include converting at least a portion of the one or more bounding boxes into a logical structure. In one or more embodiments, converting includes aligning the at least a portion of the one or more bounding boxes to one or more text lines.

Also, an additional embodiment of the invention includes removing one or more cell boxes associated with the cells in the table that do not overlap with any text boxes associated with the table, and expanding one or more remaining cell boxes associated with the cells in the table until each of the one or more remaining cell boxes is expanded to a maximum horizontal width without overlapping with one or more of the other remaining cell boxes. Expanding the one or more remaining cell boxes associated with the table can include, for example, expanding the one or more remaining cell boxes one at a time, and in a left-to-right and top-to-bottom order. Such an embodiment also includes sampling at the center of each expanded cell box, horizontally and vertically, to determine the number of rows in the table and the number of columns in the table, and determining an alignment for rows and columns of the table based at least in part on the one or more remaining cell boxes prior to said expanding. Additionally, such an embodiment includes using at least one K-means clustering technique on the one or more remaining cell boxes based at least in part on the determined number of rows in the table and the determined number of columns in the table, and assigning each of the one or more remaining cell boxes to a respective row and a respective column based at least in part on the determined alignment.

Such an embodiment can also include expanding one or more cells into one or more neighboring empty cells upon a determination that portions of text of the one or more cells overlaps into the one or more neighboring empty cells. Additionally or alternatively, such an embodiment can include splitting one or more multi-text line cells upon a determination that there is at least one empty neighboring cell, and re-assigning portions of corresponding text from the one or more split cells based at least in part on location of the corresponding text.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
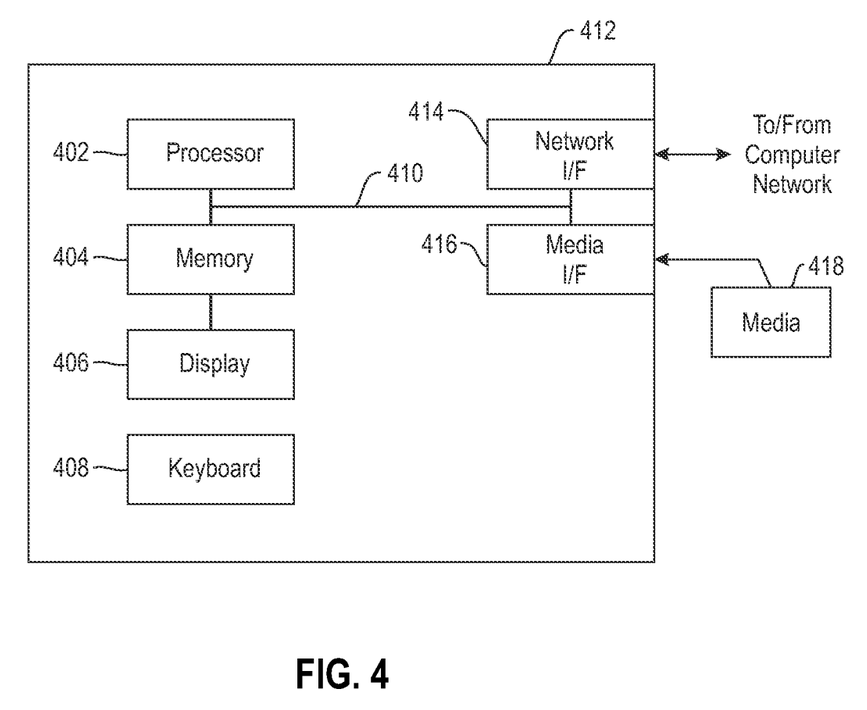
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
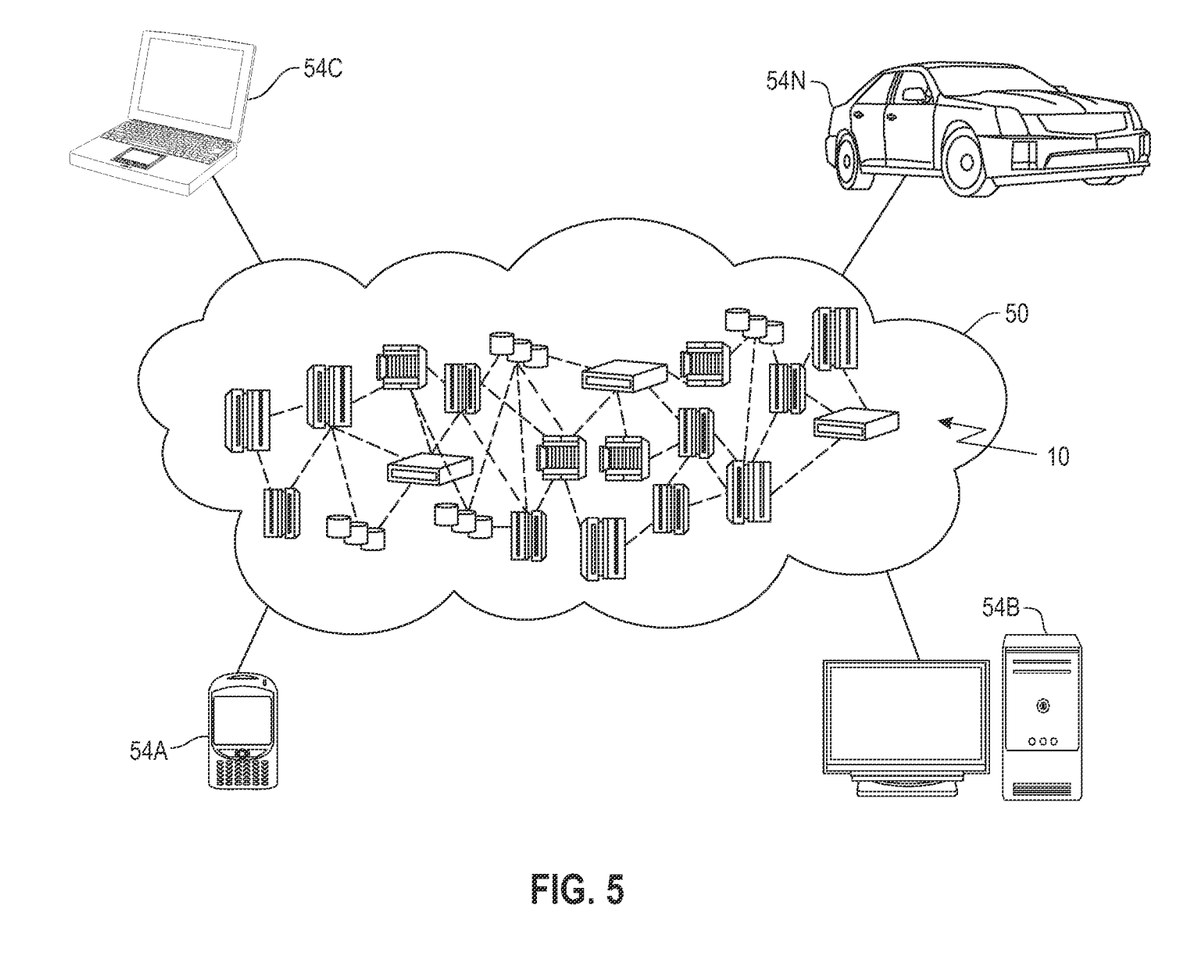
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
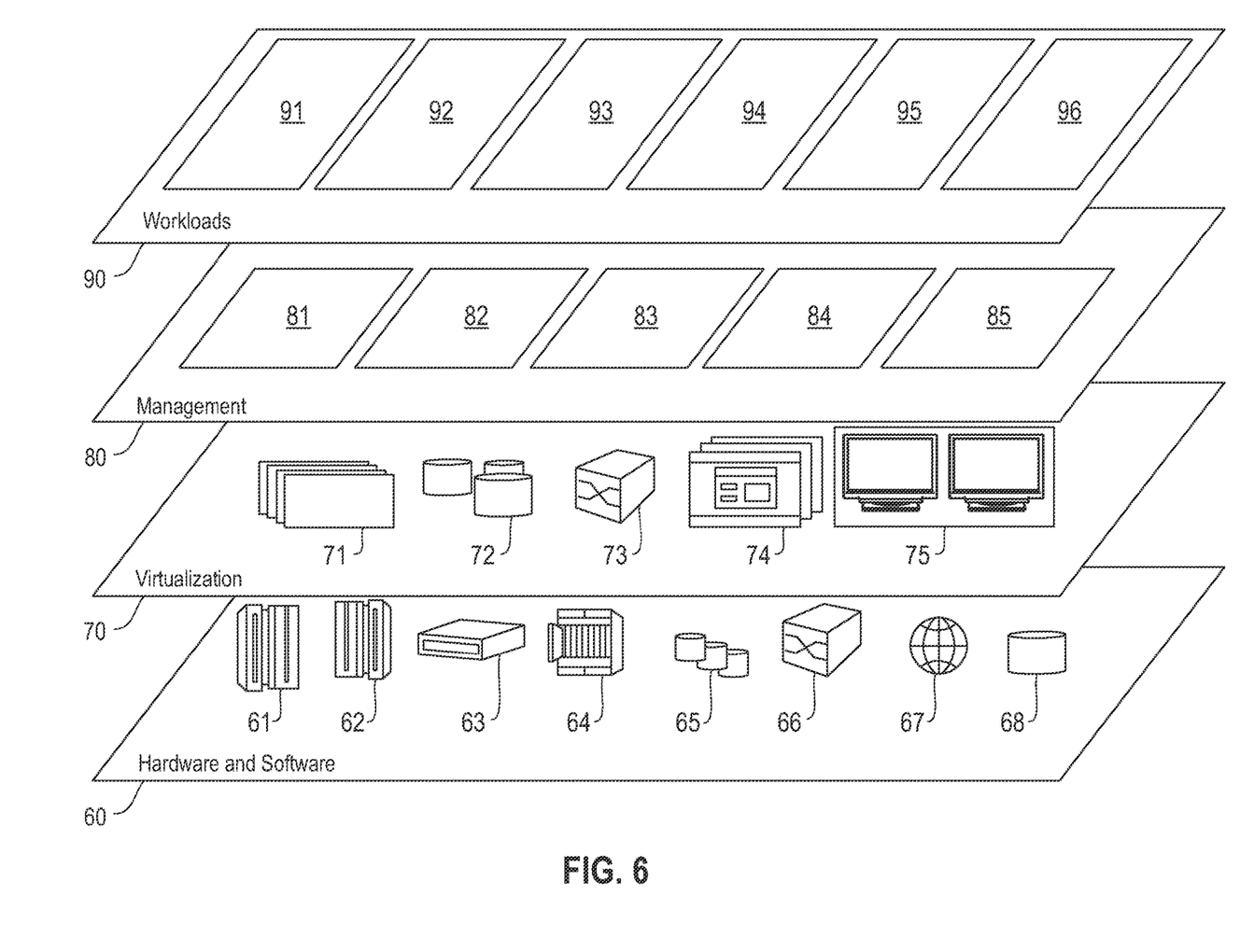
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cell structure recognition 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating a vision-guided framework for cell structured recognition which can be built on top of one or more object detection models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for use with a given table in a document, the method comprising:

detecting a style of the given table using at least one style classification model, wherein the at least one style classification model comprises at least one deep neural network trained on multiple tables comprising multiple formatting attributes;

selecting, based at least in part on the detected style, a cell detection model appropriate for the detected style;

detecting cells within the given table using the selected cell detection model; and outputting, to at least one user, information pertaining to the detected cells, the information comprising image coordinates of one or more bounding boxes associated with the detected cells; and converting at least a portion of the one or more bounding boxes into a logical structure, wherein converting comprises aligning the at least a portion of the one or more bounding boxes to one or more text lines of the given table;

wherein the method is carried out by at least one computing device.

2. The computer-implemented method of claim 1, wherein the multiple formatting attributes comprise attributes pertaining to at least two of: graphical lines, highlighting, bolding, font size, font type, and italicizing.

3. The computer-implemented method of claim 1, wherein the selected cell detection model has been trained, using the at least one deep neural network, on tables comprising at least one style similar to that of the given table.

4. The computer-implemented method of claim 1, wherein the selected cell detection model has been trained, using the at least one deep neural network, on tables comprising multiple styles.

5. The computer-implemented method of claim 1, wherein said detecting the cells within the given table comprises using one or more optical character recognition techniques in conjunction with the selected cell detection model.

6. A computer program product comprising a computer readable storage medium having program instructions embodied therewith, the program instructions executable by a computing device to cause the computing device to:

detect a style of a given table using at least one style classification model, wherein the at least one style classification model comprises at least one deep neural network trained on multiple tables comprising multiple formatting attributes;

select, based at least in part on the detected style, a cell detection model appropriate for the detected style;

detect cells within the given table using the selected cell detection model; and output, to at least one user, information pertaining to the detected cells, the information comprising image coordinates of one or more bounding boxes associated with the detected cells; and convert at least a portion of the one or more bounding boxes into a logical structure, wherein converting comprises aligning the at least a portion of the one or more bounding boxes to one or more text lines of the given table.

7. The computer program product of claim 6, wherein the multiple formatting attributes comprise attributes pertaining to at least two of: graphical lines, highlighting, bolding, font size, font type, and italicizing.

8. The computer program product of claim 6, wherein the selected cell detection model has been trained using the at least one deep neural network on tables comprising at least one style similar to that of the given table.

9. The computer program product of claim 6, wherein the selected cell detection model has been trained using the at least one deep neural network on tables comprising multiple styles.

10. The computer program product of claim 6, wherein said detecting the cells within the given table comprises using one or more optical character recognition techniques in conjunction with the selected cell detection model.

11. A system comprising:
a memory; and
at least one processor operably coupled to the memory and configured for:
detecting a style of a given table using at least one style classification model, wherein the at least one style classification model comprises at least one deep neural network trained on multiple tables comprising multiple formatting attributes;

selecting, based at least in part on the detected style, a cell detection model appropriate for the detected style;

detecting cells within the given table using the selected cell detection model; and outputting, to at least one user, information pertaining to the detected cells, the information comprising image coordinates of one or more bounding boxes associated with the detected cells; and converting at least a portion of the one or more bounding boxes into a logical structure, wherein converting comprises aligning the at least a portion of the one or more bounding boxes to one or more text lines of the given table.

12. The system of claim 11, wherein the multiple formatting attributes comprise attributes pertaining to at least two of: graphical lines, highlighting, bolding, font size, font type, and italicizing.

13. The system of claim 11, wherein the selected cell detection model has been trained using one or more of: (i) the at least one deep neural network on tables comprising at least one style similar to that of the given table and (ii) the at least one deep neural network on tables comprising multiple styles.

14. The system of claim 11, wherein said detecting the cells within the given table comprises using one or more optical character recognition techniques in conjunction with the selected cell detection model.

* * * * *